United States Patent [19]

Kotecki

[11] 4,294,614

[45] Oct. 13, 1981

[54] AUSTENITIC IRON-BASE CRYOGENIC ALLOY AND ARC WELDING ELECTRODE FOR DEPOSITING THE SAME

[75] Inventor: Damian J. Kotecki, Spring Garden Township, York County, Pa.

[73] Assignee: Teledyne Industries, Inc., Los Angeles, Calif.

[21] Appl. No.: 85,471

[22] Filed: Oct. 17, 1979

[51] Int. Cl.³ .................... C22C 39/54; C22C 38/04; C22C 38/44
[52] U.S. Cl. .............. 75/128 A; 75/128 C; 75/128 W; 148/12 E; 428/683
[58] Field of Search ........ 428/683; 75/128 A, 128 C, 75/128 W; 148/12 EA, 12 E

[56] References Cited

U.S. PATENT DOCUMENTS

| | | | |
|---|---|---|---|
| 2,671,726 | 3/1954 | Jenning | 75/128 |
| 2,914,346 | 11/1959 | Ryder | 285/189 |
| 3,210,213 | 10/1965 | Cotter et al. | 117/205 |
| 3,231,709 | 1/1966 | Foley | 219/76 |
| 3,362,813 | 1/1968 | Ziolkowski | 75/128 |
| 3,723,104 | 3/1973 | Lowe | 75/128 R |
| 3,726,668 | 4/1973 | Bäumel | 75/125 |
| 3,859,083 | 1/1975 | Kusaka et al. | 75/128 A |
| 3,900,316 | 8/1975 | Mackay et al. | 75/128 A |
| 3,902,899 | 9/1975 | Sponseller | 75/128 A |
| 3,912,503 | 10/1975 | Schumacher et al. | 75/125 |
| 4,000,984 | 1/1977 | Bäumel | 29/183 |
| 4,035,182 | 7/1977 | Kowaka et al. | 75/122 |
| 4,099,967 | 7/1978 | Schumacher et al. | 75/128 A |
| 4,172,716 | 10/1979 | Abo et al. | 75/124 |

FOREIGN PATENT DOCUMENTS 476413 12/1937 United Kingdom ............ 75/128 A

Primary Examiner—L. Dewayne Rutledge
Assistant Examiner—Upendra Roy
Attorney, Agent, or Firm—Charles J. Long

[57] ABSTRACT

An austenitic iron-base cryogenic alloy consisting essentially of, in weight percent,

| | |
|---|---|
| Carbon | 0.20 max. |
| Manganese | 3.5 to 7.0 |
| Silicon | 0.75 max. |
| Chromium | 13.0 to 17.0 |
| Nickel | 14.0 min. |
| Molybdenum | 1 to 3 |
| Iron plus unavoidable impurities | Balance, | and containing no more than 2 FN delta ferrite, said alloy displaying at least 15 mils lateral expansion when impact tested by the Charpy V-notch test at −320 F. Also, a tubular composite arc welding electrode which deposits such alloy.

4 Claims, No Drawings

AUSTENITIC IRON-BASE CRYOGENIC ALLOY AND ARC WELDING ELECTRODE FOR DEPOSITING THE SAME

BACKGROUND OF THE INVENTION

1. Field of the Invention

This invention relates to austenitic iron-base cryogenic alloys. More particularly, it relates to such alloys which show superior Charpy V-notch impact strength at −320° F. My alloy is particularly useful as a weld deposit, in which form it is compatible in cryogenic properties with austenitic stainless steel and ASTM A203E steel base plates. The invention also relates to a tubular composite arc welding electrode which deposits such alloy when used in an arc welding process.

2. Description of the Prior Art

In weld fabrication of magnet cases for fusion reactors, such as those of the Tokomak design, which in use are cooled by liquid helium (−452° F.), it is necessary to use weld filler metal which is compatible with the plate material in both tensile strength and impact toughness. Typical of plate material used in such applications are austenitic stainless steels such as AISI 304L and 316L, both of which meet 70,000 psi minimum tensile strength. In addition to meeting such tensile requirements, weld metal used for joining these steels must exhibit at least 15 mils lateral expansion when tested in the Charpy V-notch impact test at −320° F. Details of the Charpy test, which is well known and commonly used in the metallurgical field, are set forth in ASTM E23-72.

In addition to the fusion reactor applications, there are increasing numbers of cryogenic applications requiring iron-base alloys, either as plate material or as weld filler metal. Satisfactory plate material is often available for such applications, for example the low carbon austenitic stainless steels mentioned above and their regular carbon equivalents, and ASTM A203E steel which contains about 3½% nickel. Available weld filler metals, however, have not heretofore been completely satisfactory for a number of reasons. Prior workers have sometimes used nickel base alloys such as INCONEL* 82 (AWS ENiCr-3) as filler metals; although such filler metals have satisfactory cryogenic properties, they are extremely expensive, particularly when used with relatively low cost plate material such as AISI 304L and 316L. Filler metals matching the chemistry compositions of the plate material such as the austenitic stainless steel grades are generally deficient in impact toughness, due to the metallurgical structures which they develop in weld deposition.

*Registered Trademark of the International Nickel Company.

A few specialized austenitic iron-base filler metal alloys have been developed for use in covered electrode weld joining of cryogenic plate of the above discussed types. Typical of such alloys is one which meets the American Welding Society (AWS) chemical limits for type 316L covered electrode weld metal (AWS A5.4) but is specially balanced to have manganese and nickel at the high side of the acceptable ranges and chromium and nitrogen at the low side of such ranges. This alloy, while generally satisfactory when deposited by covered electrodes, has not been successful when deposited using tubular composite electrodes in automatic and semiautomatic arc welding processes; the reasons for such lack of success are not completely understood, but it is known that the alloy is sensitive to nitrogen, which ruins its impact strength, and the automatic and semiautomatic arc welding processes often produce deposits with higher nitrogen levels than comparable covered electrode deposits.

From the foregoing it can be seen that a need exists for an iron-base alloy which combines reasonable cost with acceptable tensile strength and cryogenic impact properties when weld deposited using tubular composite electrodes. Such alloy must be relatively insensitive to nitrogen pickup and, because several of the cryogenic plate materials such as ASTM A203E are often stress relieved after fabrication, should retain its properties after stress relief treatment; the latter requirement dictates that an acceptable alloy contain very little or no delta ferrite in the as-weld deposited condition, since such ferrite transforms to the brittle sigma phase during stress relief and thereby severely lowers impact strength of the weld joint.

SUMMARY OF THE INVENTION

I have discovered that by maintaining its analysis within limits to be described hereinbelow an austenitic iron-base cryogenic alloy can be produced which has tensile and impact properties suitable for cryogenic use to temperatures at least as low as −320° F., and which combines relative insensitivity to nitrogen pickup with stress relievability when weld deposited from a tubular composite electrode in arc welding processes such as the gas metal arc (GMA), submerged arc (SA), and self-shielded processes.

In accordance with the invention, I provide an austenitic iron-base cryogenic alloy consisting essentially of, in weight percent,

| Carbon | 0.20 max. |
|---|---|
| Manganese | 3.5 to 7.0 |
| Silicon | 0.75 max. |
| Chromium | 13.0 to 17.0 |
| Nickel | 14.0 min. |
| Molybdenum | 1 to 3 |
| Iron plus unavoidable impurities | Balance | and containing no more than 2FN delta ferrite, said alloy displaying at least 15 mils lateral expansion when impact tested by the Charpy V-notch test at −320° F.

In a preferred form, my alloy contains at least 0.05 percent carbon.

In another preferred form, my alloy contains at least 0.10 percent carbon.

Preferably my alloy is in the form of a weld deposit.

I further provide a tubular composite arc welding electrode comprising a metallic outer sheath and a core within and enclosed by the sheath, the sheath and core being so balanced that when melted together in the heat of a welding arc they form an austenitic iron-base cryogenic alloy weld deposit containing no more than 2FN delta ferrite and consisting essentially of, in weight percent,

| Carbon | .20 max. |
|---|---|
| Manganese | 3.5 to 7.0 |
| Silicon | 0.75 max. |
| Chromium | 13.0 to 17.0 |
| Nickel | 14.0 min. |
| Molybdenum | 1 to 3 |
| Iron plus unavoidable impurities | Balance. |

DETAILED DESCRIPTION OF THE INVENTION

Although the following description deals with the alloy of my invention in the form of weld deposits, it is to be understood that I contemplate satisfactory use of the alloy in wrought and cast forms as well, since fewer of the cryogenic metallurgical problems peculiar to weld deposits are present in wrought and cast material.

In my efforts to develop an alloy which would have a minimum tensile strength of 70,000 psi and show at least 15 mils lateral expansion in the Charpy V-notch impact test at $-320°$ F. when produced as a weld deposit from a tubular composite electrode, I used as a starting point the composition limits for AWS Type ER316L weld deposits, shown in Table 1, since such composition is related to that of the AISI 316L plate used in many cryogenic applications. As mentioned above, tubular composite electrode arc welding deposits matching the AWS analysis range do not generally have the impact strength required for cryogenic applications; in addition, such deposits frequently contain enough delta ferrite in the as-deposited condition to render them unsatisfactory after stress relief because of transformation of the ferrite to the brittle sigma phase.

I discovered that in tubular composite electrode arc welding deposits a slight drop in chromium, of the order of about 2 weight percent, from the minimum AWS 316L chromium limit, coupled with an increase in nickel above the AWS 316L maximum, resulted in unexpectedly significant improvement in Charpy V-notch impact strength, and that if the analysis was balanced to contain no or very little delta ferrite the superior impact strength was retained even after a typical stress relief of 8 hours at 1150° F.

The above stated analytical limits of the alloy and weld deposit of my invention are based on the following considerations:

Carbon is generally necessary to keep the alloy's tensile strength above the desired minimum level. To consistently meet 70,000 psi minimum tensile strength I prefer carbon above 0.05 weight percent and for a 75,000 psi tensile strength minimum I prefer carbon at or above 0.10 weight percent. Addition of carbon also improves fissure resistance in weld deposits of my invention; because of the low or no ferrite levels of such deposits some fissures will nearly always be present, but carbon helps to minimize them. Carbon above 0.20 weight percent will tend to degrade impact strength so I limit my analysis to 0.20 weight percent maximum carbon.

Manganese in the range 3.5 to 7.0 weight percent improves impact strength at cryogenic temperatures and weld deposit fissure resistance. Below 3.5 weight percent manganese fissures tend to increase and above 7.0 weight percent the impact strength begins to fall off.

Silicon above about 0.75 weight percent has adverse effects on both impact strength and weld deposit fissure resistance in the alloy of my invention.

As above indicated, it is necessary to keep chromium below 17 percent by weight to maintain impact strength at consistently higher levels than prior austenitic iron base alloys used in tubular composite electrode arc welding deposits. I have found, however, that at least 13.0 percent chromium is necessary to stabilize the austenite in my alloy.

In the alloy of my invention, as in other austenitic alloys, nickel acts as the principle factor in imparting good basic impact toughness, and I have found that at least 14 percent nickel is required for this purpose in my alloy. Although I have set no maximum limit on nickel content, since theoretically nickel can go as high as desired without significant adverse metallurgical effects, high levels of nickel add undesirably to the cost of my alloy and nickel above about 17 percent makes it virtually impossible to fabricate tubular composite electrodes with inexpensive mild steel sheath material. Accordingly, when preparing tubular composite electrodes of my invention, I normally balance such electrodes to provide undiluted deposit nickel in the range of 15 to 17 percent by weight.

Molybdenum from 1 to 3 percent by weight in my alloy helps to stabilize the austenite and also improves weld deposit fissure resistance. Molybdenum at levels greater than 3% adds to the cost of my alloy and tends to lower the alloy's impact toughness.

In addition to the foregoing, impurities such as sulfur, phosphorus, and nitrogen should be kept as low as possible in my alloy as in most iron base alloys. I have, however, found that weld deposits of my invention are surprisingly tolerant to nitrogen; deposits containing up to 0.12 weight percent nitrogen, while showing slight decreases in impact strength, still are well above the minimum 15 mils Charpy V-notch toughness at $-320°$ F.

In the austenitic alloy weld deposits of my invention, the presence of delta ferrite in the metallurgical structure has adverse effects upon the impact strength of the as-deposited alloy. More importantly, however, delta ferrite can transform to the brittle sigma phase during stress relief and can thereby severly lower the deposit impact strength. Accordingly, I require that my alloy have no more than 2FN delta ferrite, FN being an arbitrary unit of ferrite measurement as defined in AWS Standard A4.2 and elsewhere in the welding literature. The amount of delta ferrite present in weld deposits can be determined by calculation using the chemical analysis of the deposit and a specialized phase diagram, such as the DeLong diagram set forth in the July 1974 Welding Research Supplement to the *Welding Journal* (published by AWS) at page 279-s. Preferably, however, ferrite is determined by measurement using instruments which relate the magnetic strength of a deposit to the amount of delta ferrite present therein; such measurement, well known to those skilled in the welding art, is described in more detail in AWS Standard A4.2.

Other details, objects and advantages of my invention will become apparent as the following description of certain present preferred embodiments thereof proceeds.

Table 1 presents chemical and physical data on a number of alloy weld deposits of the prior art and six alloy weld deposits of my invention. In addition, the table sets forth the AWS analysis limits for type 316L austenitic stainless steel weld metal. In regard to the AWS limits, those for ER316L and E316L-T3 apply to deposits from tubular composite electrodes used in automatic and semiautomatic arc welding processes, and it was from this base I began my investigation, as indicated above.

All the weld deposits shown in Table 1 were produced using tubular composite welding electrodes, each of which comprised a metallic outer sheath and a core within and enclosed by the sheath; the sheath in all cases was formed from C1003 steel, with alloying and fluxing or slag-forming ingredients supplied from the fill. Fabrication of such electrodes may be accomplished by any of several commonly known methods. The object of any such method is to enclose a core of chosen materials, generally in finely divided form, in a suitable metal sheath in such a way that none of the core material can be lost and the incursion of air or moisture into the core is minimized or prevented. Selection of core materials, in addition to being based on the desired slag system, operational characteristics and weld deposit chemistry, takes into account objectives such as low moisture content and rehydration rate and similar aims recognized by those skilled in the art. Sheath metal is selected primarily on the basis of its formability and its contribution to overall electrode chemistry; good formability is necessary in order to fabricate the tube and the sheath normally contributes the major portion of the electrode chemistry. As previously indicated, the most economical fabrication of tubular composite electrodes utilizes mild steel sheath enclosing a core containing metal-bearing powdered alloy materials; if such an arrangement does not provide sufficient alloy content, e.g. for nickel-base alloy electrodes, it is possible to use sheath made of alloy steel or of alloying metal such as essentially pure nickel, but such approach significantly increases the cost of the finished electrode.

TABLE 1

Undiluted Weld Deposits: As-deposited properties unless otherwise indicated

| Example No. | Grade | Process | Shielding | C | Mn | Si | Cr | Ni | Mo | S | P | N | Delta Ferrite, FN[1] | Tensile Strength, ksi | CVN Mils @ −320F | Comments |
|---|---|---|---|---|---|---|---|---|---|---|---|---|---|---|---|---|
| AWS E316L | 316L | Covered Electrode | External Covering | .04 max | 2.5 max | .90 max | 17.0/20.0 | 11.0/14.0 | 2.0/2.5 | .03 max | .04 max | No Spec | | | | |
| AWS ER316L | 316L | GMA, GTA, SA | Various Gases, Flux | .03 max | 1.0/2.5 | .25/.60 | 18.0/20.0 | 11.0/14.0 | 2.0/3.0 | .03 max | .03 max | No Spec | | | | |
| AWS E316L-T3 | 316L | Self-Shielded | Air | .03 max | 1.0/2.5 | 1.0 max | 18.0/20.5 | 11.0/14.0 | 2.0/2.5 | .03 max | .04 max | | | | | |
| 1 (Prior Art) | 316L | Self-Shielded | Air | .022 | 2.00 | 0.63 | 19.75 | 13.15 | 2.4 | .016 | <.03 | .12 | 5.1 | — | 2.7 | |
| 2 (Prior Art) | 316L | Self-Shielded | " | .026 | 2.42 | 0.35 | 18.82 | 13.55 | 2.3 | .013 | <.03 | .052 | 5.4 | 77 | 7.7 | |
| 2 SR[2] | " | Self-Shielded | | | | | | | | | | | | 81 | 0 | |
| 3 (Prior Art) | 316L Mod | GMA | 99% Ar 1% O₂ | .014 | 2.17 | 0.46 | 18.68 | 15.15 | 2.3 | .013 | .010 | .030 | 0.9 | 73 | 17.0 | |
| 3 (Prior Art) | 316L Mod | SA | Lincoln ST100 Flux | .016 | 2.50 | 1.03 | 19.61 | 15.32 | 2.2 | .011 | .021 | .016 | 2.2 | 79 | 3.0 | |
| 4 | Invention | GMA | 99% Ar 1% O₂ | .021 | 4.00 | 0.26 | 15.76 | 16.33 | 1.5 | .014 | <.03 | .024 | 1.2 | 69 | 30 | |
| 4 | " | SA | Lincoln ST100 Flux | .024 | 3.96 | 0.55 | 16.95 | 16.50 | 1.5 | .011 | <.03 | .024 | 0.7 | 70 | 31 | |
| 5 | Inv. but low Mn | Self Shielded | Air | .020 | 2.18 | 0.29 | 15.17 | 15.30 | 1.5 | .014 | <.03 | .06 | 0.7 | 70 | 32 | High Fissures |
| 6 | Invention | Self Shielded | " | .021 | 4.40 | 0.26 | 15.26 | 15.19 | 1.5 | .012 | <.03 | .06 | 0.7 | 72 | 37 | Low Fissures |
| 7 | Invention | Self Shielded | Air | .101 | 4.60 | 0.36 | 15.72 | 16.30 | 1.5 | .013 | .004 | .035 | 0.4 | 76 | 33 | |
| 7 SR | | | | | | | | | | | | | | 78 | 33 | |
| 8 | Invention | Self Shielded | Air | .192 | 4.50 | 0.30 | 15.47 | 15.50 | 1.6 | .013 | <.03 | .06 | 0.9 | 85 | 28 | |
| 8 SR | | | | | | | | | | | | | | 87 | 24 | |
| 9 | Invention | Self Shielded | Air | .011 | 3.70 | 0.33 | 15.34 | 17.0 | 1.6 | .014 | .005 | .12 | 0.4 | 72 | 23 | |

[1]Ferrite measured using Aminco-Brenner Magne-Gage per AWS A4.2
[2]SR - Stress Relieved for 8 hrs @ 1150F As is evident from Table 1, several arc-welding processes were employed in producing the exemplary weld deposits; all are well known in the automatic and semi-automatic welding art. in the GMA and SA processes arc shielding is provided respectively by externally supplied shielding gas, such as argon-oxygen mixtures or carbon dioxide, and by granular flux heaped along the weld line so as to "submerge" the arc; in the self-shielded process arc shielding is supplied from components of the tubular electrode core, with no externally supplied shielding necessary.

PRIOR ART—EXAMPLES 1 THROUGH 3

Examples 1 and 2 meet the AWS requirements for E316L-T3 deposits of the prior art. As deposited, both examples contained over 5FN Delta ferrite and showed well below 15 mils lateral expansion in the Charpy V-notch test at −320° F. As shown for Example 2, stress relief of such alloys causes the delta ferrite to transform to sigma phase, which ruins such impact toughness as may be present in the as-deposited alloy.

Example 3 represents a modified Type 316L in which nickel was increased slightly over the AWS range with no decrease in chromium. The added nickel resulted in very low weld deposit ferrite in the GMA process and it will be seen that the GMA deposit showed slightly over 15 mils lateral expansion in the Charpy V-notch test at −320° F. However, use of the same electrode in the SA process with Lincoln ST-100 flux, a well-known flux designed for use with stainless steels, resulted in an increase in deposit ferrite to 2.2FN and a severe drop in Charpy V-notch lateral expansion to 3 mils, well below the 15 mils minimum needed for the above-discussed cryogenic applications.

It can thus be seen that none of the prior art examples was suitable for general use in cryogenic applications requiring 15 mils or more lateral expansion in the Charpy V-notch test at −320° F.

INVENTION—EXAMPLES 4 THROUGH 9

The weld deposits of Example 4, both prepared using the same tubular composite electrode, illustrate the tolerance of alloys of my invention to process variables. Whether deposited with the GMA process or the SA process, the alloy of Example 4 shows superior Charpy V-notch impact properties at −320° F.; i.e., the SA process did not adversely affect impact properties of Example 4 as it did in prior art Example 3. Since the carbon level was low in Example 4, the tensile strength was at the low end of the preferred range; as stated above, I may maintain carbon above 0.05 weight percent if it is necessary to keep the alloy's tensile strength at or above 70 ksi.

Examples 5 and 6 illustrate the need for manganese above the AWS limits to minimize fissures in weld deposits according to the invention. Both examples are essentially equivalent in both analysis and mechanical properties, but Example 5 has manganese within the AWS range while Example 6 has manganese in the range required in the practice of my invention. Based on visual examination of the surfaces of broken tensile bolts, the deposit of Example 5 showed a high level of fissures while that of Example 6 had an acceptably low number of fissures for an austenitic alloy. I have found that manganese above 3.5 weight percent consistently provides low weld deposit fissure levels in the alloy of my invention.

The tolerance of my alloy to stress relief is shown by the deposit of Example 7, where it can be seen that stress relief of 8 hrs at 1150° F. had virtually no effect on either tensile or impact properties.

For applications requiring tensile strength at or above 75 ksi, I maintain the carbon content of my alloy above 0.10 weight percent. Example 7 is one such alloy, containing 0.10 weight percent carbon. In Example 8 the 0.192 weight percent carbon is near the 0.20 weight percent maximum required in the practice of my invention, and this example illustrates both the higher tensile strength obtained with carbon above 0.10 weight percent and the minimal effect on both as-deposited and stressrelieved impact properties of carbon near the top of my range.

As previously stated, the alloy of my invention is surprisingly tolerant to relatively high nitrogen levels. In related alloys of the prior art high nitrogen levels cause a drastic increase in yield strength and a concomitant decrease in Charpy V-notch lateral expansion at cryogenic temperatures; as illustrated by Example 9, in the alloy of my invention nitrogen as high as 0.12 weight percent causes only a slight decrease in Charpy V-notch lateral expansion at −320° F. but even with such decrease the lateral expansion is still well above the 15 mils minimum required in the previously described cryogenic applications. Thus my alloy is especially suited for use as a tubular electrode weld deposit in automatic and semi-automatic applications, in which nitrogen levels higher than those in manual electrode deposits are common. It should be pointed out, of course, that even though a surprising tolerance for nitrogen exists in the alloy of my invention, it is still desirable to avoid nitrogen so as to maintain cryogenic impact strength as high as possible.

From the foregoing it will be seen that the austenitic iron-base alloy of my invention combines consistently superior impact properties at −320° F. with tolerance for nitrogen, which makes it especially suitable for use as filler metal in automatic and semi-automatic weld joining operations, and stress relievability, which makes it useful as weld filler metal with a wide variety of cryogenic base materials.

EXAMPLE 10—TUBULAR COMPOSITE ELECTRODE

Formulation of tubular composite arc welding electrodes for depositing the alloy of my invention is done using principles familiar to those skilled in the art of weld electrode formulation. Depending on the welding process in which they are to be used, such electrodes may include a core consisting almost entirely of alloying ingredients, with perhaps a small amount of arc stabilizers such as alkali metal compounds where the GMA or SA process is used, or they may include more significant amounts of non-metallic slag formers and arc stabilizers where the self-shielded process is used. The specific non-metallic ingredients and amounts of each are not critical in the practice of my invention, the only requirement being that the arc and molten weld metal be appropriately shielded during welding; numerous satisfactory formulations are in use by those skilled in the art, and any of such formulations could be used in the practice of my invention. The factor that is critical in formulating tubular composite electrodes according to my invention is that the weld metal deposited by such electrodes meet the alloy analysis limits set forth hereinabove in the undiluted condition. By weld metal in the undiluted condition I mean weld metal that is produced exclusively by the electrode, i.e., does not contain any base material intermixed therewith when molten during the welding operations; generally, undiluted weld metal can be obtained by depositing 4 or more layers on a given base plate or, where mechanical properties are to be determined, by taking test specimens from a location in a weld far enough from the base plate to be equivalent to at least about 4 layers of weld deposit.

Balancing of weld electrode formulation to obtain a desired deposit analysis is a practice familiar to those skilled in the art. It simply involves estimating gains and losses in the various alloying elements in crossing the welding arc, balancing the alloy content of the electrode to take account of such gains and losses, preparing and analyzing a weld deposit with such electrode, and then adjusting the electrode composition based on the actual gains and losses encountered in the initial deposit.

One tubular composite electrode which produces weld deposits according to my invention is that used to produce the deposits of Example 4 on table 1. This electrode was fabricated using C1003 mild steel sheath, which constituted about 54 percent of the total electrode weight. Fill materials constituting about 46 percent of the electrode weight were added to the sheath during forming, and the formed electrode was drawn to 3/32-inch diameter for use in welding. The fill consisted of a uniform mixture of the following listed powdered materials in the designed percentages by weight of the total electrode:

| Manganese metal | 4.55 |
| Ferro silicon, 50% silicon | 0.23 |
| Low carbon ferro chromium, 75% chromium | 21.71 |
| Nickel metal | 16.38 |
| Ferro molybdenum, 60% molybdenum | 2.58 |
| Arc stabilizers | 0.55 |

Since the electrode was intended for use in the GMA and SA processes, only a very low level of arc stabilizers was used. In electrodes for use in the self-shielded process, it will be appreciated that additional quantities of arc stabilizers and slag formers would be necessary in the core of the electrode; while the specific balance of ingredients in such electrodes is different from that of Example 10, the method of arriving at the appropriate balance is the same in all cases, the criterion being that in any such electrode that sheath and core are so balanced that when melted together in the heat of a welding arc they form an austenitic iron-base cryogenic weld deposit having an analysis within my alloy limits.

While I have described certain present preferred embodiments of the invention, it is to be distinctly understood that the invention is not limited thereto but may be otherwise variously embodied within the scope of the following claims.

I claim:

1. An austenitic iron-base cryogenic alloy consisting essentially of, in weight percent,

| Carbon | 0.05 min. to 0.20 max. |
| Manganese | 3.5 to 7.0 |
| Silicon | 0.75 max. |
| Chromium | 13.0 to 17.0 |
| Nickel | 14.0 min. |
| Molybdenum | 1 to 3 |
| Iron plus unavoidable impurities | Balance, | and containing no more than 2FN delta ferrite, said alloy displaying at least 15 mils lateral expansion when impact tested by the Charpy V-notch test at $-320°$ F.

2. An alloy as claimed in claim 1 containing at least 0.10 weight percent carbon.

3. An alloy as claimed in claim 1 which is in the form of weld deposit.

4. A tubular composite arc welding electrode comprising a metallic outer sheath and a core within and enclosed by the sheath, the sheath and core being so balanced that when melted together in the heat of a welding arc they form an austenitic iron base cryogenic alloy weld deposit containing no more than 2FN delta ferrite and consisting essentially of, in weight percent,

| Carbon | 0.20 max. |
| Manganese | 3.5 to 7.0 |
| Silicon | 0.75 max. |
| Chromium | 13.0 to 17.0 |
| Nickel | 14.0 min. |
| Molybdenum | 1 to 3 |
| Iron plus unavoidable impurities | Balance. |

* * * * *

UNITED STATES PATENT AND TRADEMARK OFFICE
CERTIFICATE OF CORRECTION

PATENT NO. : 4,294,614
DATED : October 13, 1981
INVENTOR(S) : DAMIAN J. KOTECKI

It is certified that error appears in the above-identified patent and that said Letters Patent are hereby corrected as shown below:

Column 3, line 26: Delete "are", substitute -- arc -- therefor.

Column 4, line 61: Insert -- that -- between "base" and "I".

Column 9, line 4: Delete "in", substitute -- In -- therefor.

Column 10, line 14: Delete "stressrelieved", substitute -- stress-relieved -- therefor.

Column 11, line 29: Delete "designed", substitute -- designated -- therefor.

Signed and Sealed this

Twenty-second Day of December 1981

[SEAL]

Attest:

GERALD J. MOSSINGHOFF

Attesting Officer

Commissioner of Patents and Trademarks